United States Patent
Trivedi et al.

(10) Patent No.: US 12,043,772 B2
(45) Date of Patent: Jul. 23, 2024

(54) GRAPHENE OXIDE MODIFIED TWO-PART CYANOACRYLATE/FREE RADICALLY CURABLE ADHESIVE SYSTEMS

(71) Applicant: Henkel AG & CO. KGaA, Dusseldorf (DE)

(72) Inventors: Krunal Trivedi, GIDC-Vapi (IN); Nishant Tale, Pune (IN); Jayesh P. Shah, Pune (IN)

(73) Assignee: Henkel AG & Co. KGaA, Duesseldorf (DE)

(*) Notice: Subject to any disclaimer, the term of this patent is extended or adjusted under 35 U.S.C. 154(b) by 116 days.

(21) Appl. No.: 17/537,751

(22) Filed: Nov. 30, 2021

(65) Prior Publication Data
US 2022/0081591 A1    Mar. 17, 2022

Related U.S. Application Data

(63) Continuation of application No. PCT/EP2020/063378, filed on May 13, 2020.

(30) Foreign Application Priority Data

Jun. 12, 2019  (IN) .............................. 201941023223

(51) Int. Cl.
| | | |
|---|---|---|
| *C09J 4/06* | (2006.01) | |
| *B01J 31/02* | (2006.01) | |
| *C08F 220/18* | (2006.01) | |
| *C08F 220/34* | (2006.01) | |
| *C08K 3/04* | (2006.01) | |

(52) U.S. Cl.
CPC ............. *C09J 4/06* (2013.01); *B01J 31/0201* (2013.01); *C08F 220/18* (2013.01); *C08F 220/34* (2013.01); *C08K 3/042* (2017.05); *C08K 2201/005* (2013.01); *C08K 2201/006* (2013.01)

(58) Field of Classification Search
CPC .................................. C08K 3/042; C09J 4/06
See application file for complete search history.

(56) References Cited

U.S. PATENT DOCUMENTS

2014/0329959 A1  11/2014  Barnes et al.

FOREIGN PATENT DOCUMENTS

| CN | 104520396 A | 4/2015 |
|---|---|---|
| CN | 104530990 A | 4/2015 |
| CN | 108715739 A | 10/2018 |
| CN | 101663338 A | 3/2020 |
| WO | 2008112087 A1 | 9/2008 |
| WO | 2013111036 A1 | 8/2013 |
| WO | 2015155735 A | 10/2015 |

OTHER PUBLICATIONS

Guadagno L, Sarno M, Vietri U, Raimondo M, Cirillo C, Ciambelli P. Graphene-based structural adhesive to enhance adhesion performance. RSC Advances. 2015;5(35):27874-86.

*Primary Examiner* — Wenwen Cai
(74) *Attorney, Agent, or Firm* — Steven C. Bauman

(57) ABSTRACT

The present invention relates to two-part cyanoacrylate adhesive comprising a) a first part comprising a cyanoacrylate component; a peroxide catalyst; a stabilizer and a thickener; and b) a second part comprising a (meth)acrylate component; a graphene oxide; an adhesion promoter; a metal salt; and a fumed silica. Adhesive according to the present invention provides good performance as structural adhesive, good adhesion strength, good open and fix times, good tensile lap shear strength and good peel strength.

15 Claims, No Drawings

GRAPHENE OXIDE MODIFIED TWO-PART CYANOACRYLATE/FREE RADICALLY CURABLE ADHESIVE SYSTEMS

TECHNICAL FIELD OF THE INVENTION

The present invention relates to a two-part cyanoacrylate adhesive comprising a graphene oxide. The two-part cyanoacrylate according to the present invention provides good tensile lap shear and T-peel strengths.

TECHNICAL BACKGROUND OF THE INVENTION

Cyanoacrylate-based adhesives are known for their ability to rapidly bond a wide range of substrates. Cyanoacrylate-based adhesives may have weaker performance when exposed to elevated temperature and/or relative high humidity conditions. To get over this shortcoming, additional adhesives have been introduced to cyanoacrylate-based adhesives to improve the performance.

Currently there are variety of hybrid systems on the marked based on cyanoacrylates and epoxides. Epoxies have been used widely, because epoxy composition once cured forms robust bonds between wide variety of substrates. However, the current hybrid system has often limited tensile lap shear strength. In addition, when used as a structural adhesive the strength may not be enough to meet demanding assembly robustness requirements. High tensile lap shear strength may be achieved using high performance monomer/oligomers, however this increases the overall costs. Furthermore, the current hybrid two-part systems do not have a visual mixing indicator to indicate the completeness of the mixing.

In some occasions, fillers have been used in the hybrid systems, however, the fillers do not necessary increase the adhesion strength. Furthermore, the high loading of the fillers may lead to processing issues, increased viscosity, weaker adhesion and improper mixing due viscosity difference between the two parts of the composition.

Therefore, there is a need for a cyanoacrylate adhesive which can be produced with low costs while maintaining performance as a structural adhesive.

SUMMARY OF THE INVENTION

The present invention relates to a two-part cyanoacrylate adhesive comprising a) a first part comprising a cyanoacrylate component; a peroxide catalyst; a stabilizer and a thickener; and b) a second part comprising a (meth)acrylate component; a graphene oxide; an adhesion promoter; a metal salt; and a fumed silica.

The present invention also relates to a two-part cyanoacrylate composition according to the present invention, wherein the first part is transparent, and the second part is black.

The present invention further encompasses a two-part cyanoacrylate composition according to the present invention, wherein the first part and the second part are each housed in a separate chamber of a dual chamber container.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical end points includes all numbers and fractions subsumed within the respective ranges, as well as the recited end points.

All percentages, parts, proportions and then like mentioned herein are based on weight unless otherwise indicated.

When an amount, a concentration or other values or parameters is/are expressed in form of a range, a preferable range, or a preferable upper limit value and a preferable lower limit value, it should be understood as that any ranges obtained by combining any upper limit or preferable value with any lower limit or preferable value are specifically disclosed, without considering whether the obtained ranges are clearly mentioned in the context.

All references cited in the present specification are hereby incorporated by reference in their entirety.

Unless otherwise defined, all terms used in disclosing the invention, including technical and scientific terms, have the meaning as commonly understood by one of the ordinary skill in the art to which this invention belongs to. By means of further guidance, term definitions are included to better appreciate the teaching of the present invention.

The present invention relates to a two-part cyanoacrylate adhesive comprising a) a first part comprising a cyanoacrylate component; a peroxide catalyst; a stabilizer and a thickener; and b) a second part comprising a (meth)acrylate component; a graphene oxide; an adhesion promoter; a metal salt; and a fumed silica.

The composition according to the present invention provides good performance as structural adhesive, good adhesion strength, good open and fix times, improved tensile lap shear strength on Grit Blasted Mild Steel (GBMS) and improved-peel strength on GBMS and abraded aluminium.

The colour of the first part of the composition is transparent and the colour of the second part of the composition is black, and this colour difference act as an indicator of mixing level of the first and second parts. This is very important, because high mixing level of the first part and the second part is key to a good performance.

The first part of the two-part cyanoacrylate composition comprises a cyanoacrylate component. Suitable cyanoacrylate component for use in the present invention comprises $H_2C=C(CN)-COOR$, wherein R is selected from alkyl, alkoxyalkyl, cycloalkyl, alkenyl, aralkyl, aryl, allyl and haloalkyl groups, preferably R is alkyl group, and more preferably R is ethyl group.

Embodiment wherein R is ethyl group is preferred because it provides good fixture, good adhesion and fast polymerisation.

Suitable commercially available cyanoacrylate component for use in the present invention include but are not limited to ethyl cyanoacrylate from Weifang Dekel Innovative Materials Co. Ltd.

The cyanoacrylate component may be present in a two-part cyanoacrylate adhesive according to the present invention in an amount of from 60 to 95% by weight of the total weight of the first part, preferably from 68% to 95% and more preferably from 75% to 95%.

Range from 60% to 95% is preferred because less than 60% of cyanoacrylate component may lead to loss of performance, whereas quantity more than 95% may not improve the performance but increase the overall costs.

The first part of the two-part cyanoacrylate composition comprises a peroxide catalyst. The peroxide catalyst catalyses the polymerisation of a (meth)acrylate component in the second part of the composition.

Suitable peroxide catalyst for use in the first part is preferably selected from the group consisting of tert-butyl peroxide or tert-butyl perbenzoate, cumene hydroperoxide, tert-butyl peroxybenzoate, diacetyl peroxide, benzoyl peroxide, tert-butyl peracetate, lauryl peroxide and mixtures thereof, preferably selected from the group consisting of tert-butyl perbenzoate, tert-butyl peroxybenzoate, cumene hydroperoxide and mixtures thereof.

Above mentioned peroxide catalysts are preferred because they remain very stable in the presence of a cyanoacrylate monomer.

Suitable commercially available peroxide catalyst for use in the present invention include but is not limited to tert-butyl perbenzoate from AkzoNobel.

The peroxide catalyst may be present in an amount of from 0.1 to 7% by weight of the total weight of the first part, preferably from 2 to 6.75%, more preferably from 4.5 to 6.5%.

Range from 0.1% to 5% is preferred, because quantity less than 0.1% of peroxide catalyst may lead to an incomplete polymerisation, whereas quantity more than 5% may lead to too fast polymerisation.

The first part of the two-part cyanoacrylate composition comprises a stabilizer. The stabilizer improves the shelf life of the composition by stabilizing the cyanoacrylate component.

Suitable stabilizer for use in the first part is preferably selected from the group consisting of hydroquinone, sulfonic acids, $BF_3$, $SO_2$, boric acids, zinc salts, phosphoric acids, carboxylic acids and mixtures thereof, preferably stabilizer is $BF_3$.

Suitable commercially available stabilizer for use in the present invention include but is not limited to $BF_3$ from BASF SE.

The peroxide stabilizer may be present in an amount of from 1 to 5% by weight of the total weight of the first part, preferably from 2% to 4.5% and more preferably from 2.5% to 4%.

Range from 1 to 5% is preferred, because quantity less than 1% of a stabilizer may lead no adequate stabilization and a short shelf life, whereas quantity more than 5% may lead adversely affected reactivity, and therefore, extended fixture and open times.

The first part of the two-part cyanoacrylate composition comprises a thickener. Thickener modifies the viscosity of the first part of the composition.

Suitable thickener for use in the first part is preferably selected from the group consisting of ethylene polyvinyl acetate copolymer, polyvinyl fluoro copolymer, fumed silica and mixtures thereof.

Suitable commercially available thickener for use in the present invention include but are not limited to Levapren 900 from ARLANXEO Deutschland GmbH.

The thickener may be present in an amount of from 1 to 30% by weight of the total weight of the first part, preferably from 10% to 27% and more preferably from 15% to 25%.

Range from 1 to 30% is preferred, because quantity less than 1% of a thickener may lead not ideal viscosity and incomplete mixing, whereas quantity more than 30% of a thickener may lead to too viscose composition and poor performance on a monomer level.

The first part of the two-part cyanoacrylate composition may optionally comprise an adhesion promoter. The optional adhesion promoter in the first part promotes the adhesion to a metal surface.

Suitable adhesion promoter for use in the first part is an acid. Preferably the acid is selected from the group consisting of $H_3PO_2$, $H_2SO_4$, malic acid and mixtures thereof.

An acid is preferred as an adhesion promoter because the acid functionality itches the surface of the substrate and therefore provides better adhesion.

Suitable commercially available adhesion promoter for use in the first part include but are not limited to KAYAMER PM-2 from Nippon Kayaku.

The adhesion promoter may be present in the first part of the two-part cyanoacrylate adhesive according to the present invention in an amount of from 0.01% to 0.1% by weight of the total weight of the first part, preferably from 0.02% to 0.08% and more preferably from 0.03% to 0.06%.

Range from 0.01% to 0.1% is preferred, because less than 0.01% of an adhesion promoter may lead no adhesion promotion, whereas quantity more than 0.1% of an adhesion promoter may slow down/decrease the performance of the adhesive.

In an embodiment, wherein the first part and the second part of the two-part cyanoacrylate composition both comprise an adhesion promoter, the adhesion promoter of the first part and the adhesion promoter of the second part are different.

The second part of the two-part cyanoacrylate composition comprises a (meth)acrylate component.

The (meth)acrylate component may be present in an amount of from 80 to 95% by weight of the total weight of the second part, preferably from 85 to 90%.

Range from 80 to 95% is preferred, because quantity less than 80% of (meth)acrylate component may lead loose of general strength, whereas quantity more than 95% of (meth)acrylate component may lead loose of overall performance.

The (meth)acrylate component according to the present invention comprises a (meth)acrylate monomer comprising OH-group, a (meth)acrylate oligomer A and a (meth)acrylate oligomer B. More specifically the (meth)acrylate component comprises from 20 to 50% by weight of the total weight of the (meth)acrylate component of (meth)acrylate monomer comprising OH-group, from 5 to 70% by weight of the total weight of the (meth)acrylate component of a (meth)acrylate oligomer A and from 5 to 25% by weight of the total weight of the (meth)acrylate component of a (meth)acrylate oligomer B.

The (meth)acrylate component according to the present invention comprises a (meth)acrylate monomer comprising OH-group. The (meth)acrylate monomer comprising OH-group provides adhesion strength to the composition.

Suitable (meth)acrylate monomer comprising OH-group for use in the present invention can be selected from the group consisting of N-(2-hydroxypropyl) methacrylamide, 2-hydroxy propyl methacrylate (HPMA), hydroxy ethyl methacrylate (HEMA) and mixtures thereof.

Above listed monomers are preferred because they provide good adhesion properties and viscosity control.

Suitable commercially available (meth)acrylate monomers comprising OH-group for use in the present invention include but are not limited to HPMA from Evonik.

The (meth)acrylate component according to the present invention may comprise from 20 to 50% by weight of the total weight of the (meth)acrylate component of (meth)acrylate monomer comprising OH-group, preferably from 25 to 35%.

Range from 20% to 50% is preferred, because quantity less than 20% may not be enough to provide adequate adhesion strength on a metal, whereas quantity more than 50% may decrease the adhesion strength but increase the costs.

The (meth)acrylate component according to the present invention comprises a (meth)acrylate oligomer A. The (meth)acrylate oligomer A provides adhesion strength to the composition.

Suitable (meth)acrylate oligomer A for use in the present invention is selected from the group consisting of an epoxy acrylate oligomer, an aromatic epoxy acrylate oligomer, an aliphatic epoxy acrylate oligomer, polyester (meth)acrylate oligomer and mixtures thereof, preferably (meth)acrylate oligomer A is selected from the group consisting of bisphenol-A epoxy diacrylate, bisphenol-F epoxy diacrylate oligomer, cycloaliphatic epoxy diacrylate oligomer and mixtures thereof.

Above mentioned preferred (meth)acrylate oligomers improve adhesion and strength of the composition.

Suitable commercially available (meth)acrylate oligomer A for use in the present invention include but are not limited to CN2003EU from Sartomer.

The (meth)acrylate component according to the present invention comprises from 5 to 70% by weight of the total weight of the (meth)acrylate component of a (meth)acrylate oligomer A, preferable from 25 to 65% and more preferably 45% to 60%.

Range from 5% to 70% is preferred, because quantity less than 5% may not be enough to provide adequate adhesion strength and there may occur delays in fixture time and open time, whereas quantity more than 70% may only increase the costs without providing any additional technical benefit.

The (meth)acrylate component according to the present invention comprises a (meth)acrylate oligomer B. The (meth)acrylate oligomer B provides adhesion properties to the composition and maintains basic strength of the composition.

Suitable (meth)acrylate oligomer B for use in the present invention is an epoxy acrylate oligomer. Preferably, (meth)acrylate oligomer B is selected from the group consisting of, phenol 4,4'-(1-methylethylidene) bis-polymer with (chloromethyl)oxirane 2-propenoate, aromatic polyester diacrylate, cycloaliphatic polyester diacrylate, aliphatic polyester diacrylate and mixtures thereof.

Above mentioned (meth)acrylate oligomers are preferred because they provide good impact resistance.

Suitable commercially available (meth)acrylate oligomer B for use in the present invention include but are not limited to CN104 from Sartomer.

A (meth)acrylate oligomer B may be present in an amount from 5% to 25% by weight of the total weight if the (meth)acrylate component, preferable from 12% to 20%.

Range from 5% to 25% is preferred, because quantity less than 5% there may occur delays in fixture time and open time, whereas quantity more than 25% may only increase the costs without providing any additional technical benefit.

Preferably the ratio of a (meth)acrylate monomer comprising OH-group, a (meth)acrylate oligomer A and a (meth)acrylate oligomer B is 1:2:0.5.

The applicant has surprisingly found that the ratio 1:2:0.5 provides ideal toughness, aging stability and strength without adversely affecting bead, open and fixture times.

The second part of the two-part cyanoacrylate composition comprises a graphene oxide. Graphene oxide provides mechanical strength to the composition and additional advantage is graphene oxide acting as mixing indicator.

Suitable graphene oxide for use in the present invention has a specific surface area about 350 $m^2/g$ wherein specific surface area is measured according to ASTM B922-17 and/or an average particle size from 500 to 800 nm wherein average particle size is measured according to ISO 13320: 2009 and/or 10-11 graphene platelet layers.

The Applicant has surprisingly found out that above mentioned specific surface area and particle size promote and improve the strength of the adhesive.

Graphene oxide as well as the (meth)acrylate component are both polar and that is enabling good mixing. Graphene oxide particles with multiple layers are preferred because polar (meth)acrylate component goes to the layers of the graphene oxide and provides a continuous matrix.

Suitable commercially available graphene oxide for use in the present invention include but are not limited to XPA from Yasham speciality ingredients Pvt ltd.

Graphene oxide may be present in an amount of from 0.05 to 1.1% by weight of the total weight of the second part, preferably from 0.1 to 1.0%, and more preferably from 0.2 to 0.5%.

Range from 0.05% to 1.1% is preferred, because quantity less than 0.05% there may not be improvement in mechanical strength, whereas quantity more than 1.1% may not increase the mechanical strength further, but rather will decrease it.

The second part of the two-part cyanoacrylate composition comprises an adhesion promoter. The adhesion promoter in the second part promotes general adhesion. The adhesion promoter of the second part is different than the optional adhesion promoter of the first part.

Suitable adhesion promoter of the second part is a polymerizable compound, wherein the adhesion promoter polymerises itself within the composition. Preferably the adhesion promoter of the second part is a (meth)acrylate having an acid functionality.

Preferably the adhesion promoter is selected from the group consisting of methacryloyloxyethyl phosphate, methacryloyloxyethyl phosphate ester and mixtures thereof.

Suitable commercially available adhesion promoter for use in the present invention include but are not limited to PM2 from Nippon Kayaku.

Adhesion promoter may be present in an amount of from 0.01 to 0.03% by weight of the total weight of the second part.

A range from 0.01% to 0.03% is preferred being an optimal range, because quantity less than 0.01% there may not lead to improvement in adhesion properties, whereas quantity more than 1.1% may not increase the adhesion strength.

The second part of the two-part cyanoacrylate composition comprises a metal salt. The metal salt catalyses and initiates the cyanoacrylate reaction in the first part.

Suitable metal salt for use in the present invention is selected from the group consisting of copper-based salts, cobalt-based salts, iron-based salts and mixtures thereof. Preferably, the metal salt is $Cu^{2+}$.

Suitable commercially available metal salt for use in the present invention include but are not limited to copper(II) oxide $Cu^{2+}$ from Sigma Aldrich.

Metal salt may be present in an amount of from 0.3 to 0.7% by weight of the total weight of the second part.

A range from 0.3% to 0.7% is preferred, because quantity less than 0.3% of metal salt may not lead to fast enough reaction, whereas quantity more than 0.7% may lead to too fast and exothermic reaction.

The second part of the two-part cyanoacrylate composition comprises a fumed silica. Fumed silica is used to adjust the viscosity of the second part of the composition.

It is preferred that fumed silica has BET surface area from 90 to 150 $m^2/g$.

Suitable commercially available fumed silica for use in the present invention include but are not limited to Cab O Sil TS 720 grade from Cabot, Aerosil R 972 grade from Evonik and HDK H18 grade from Wacker.

Fumed silica may be present in an amount of from 5 to 14% by weight of the total weight of the second part.

A range from 5% to 14% is preferred, because quantity less than 5% of fumed silica may lead to too flowable second part of the composition, whereas quantity more than 14% may lead to too thick and difficult to dispense second part of the composition.

It is desired that the viscosity of the first part is preferably from 4000 MPas to 5000 MPas and the viscosity of the second part is preferably from 17000 M Pas to 27500 M Pas. Viscosity is measured on a Rheometer from Brookfield CAP viscometer Q-2000+ using a cone-plate geometry with spindle no. 5 having a 0.9 cm in diameter plate at 20 rpm shear rates for 1 min.

If the viscosity of the second part is less than 17000 MPas the mixing of the first and second parts may not be complete leading to poor mechanical performance. Whereas if the viscosity of the second part is greater than 27500 MPas, it may be difficult to dispense the product out of the cartridge or syringe, and in addition, it may be difficult to mix together with the first part and this may to lead poor mechanical performance.

A two-part cyanoacrylate adhesive according to the present invention may further comprise non-metal fillers, metal fillers and plasticizers.

According to the present invention the first part of the composition is transparent, and the second part of the composition is black. This colour difference works also as a mixing indicator.

It is desired that the bead time of the composition according to the present invention is 5-10 min.

It is desired that the fixture time of the composition according to the present invention is 10-15 min.

It is desired that the tensile lap shear strength (TLS) of the composition according to the present invention is 28-35 MPa.

It is desired that the T-peel of the composition according to the present invention is 0.7-1.2 MPa.

A two-part cyanoacrylate composition according to the present invention has the first part and the second part present in a ratio of 1:1 by volume.

The 1:1 ratio is preferred because it provides ideal bead, open and fixture times in combination with good adhesion and mechanical properties.

A two-part cyanoacrylate composition according to the present invention has the first part and the second part each housed in a separate chamber of a dual chamber container.

EXAMPLES

Example 1—Screening of Graphene Oxide Grades for Cyanoacrylate/Free Radically Curable Adhesive Systems The four grades were evaluated for immediate strength improvement at different loading of graphene oxide in the second part of the two-part composition. Graphene grades were different in terms of average specific area, number of platelets layers, and an average particle size. Evaluated particles and their properties are listed in table 1. Based on the strength improvement results, one grade (XPA) was selected for the further investigation.

TABLE 1 different graphene grades

| Grades | Average Specific Area ($m^2/g$) | Average Particle Size | Graphene Platelets layers |
|---|---|---|---|
| X300 (from Yasham speciality ingredients Pvt. Ltd.) | 300 | ≈1 μm | 10-20 |
| X500 (from Yasham speciality ingredients Pvt. Ltd.) | 450 | 40-200 nm | 4-7 |
| XPA (from Yasham speciality ingredients Pvt. Ltd.) | 350 | 500-800 nm | 10-11 |
| XPL (from Yasham speciality ingredients Pvt. Ltd.) | 200 | 0.5-1 μm | 13-14 |

The specific surface area of the graphene was measured according to ASTM B922-17.

The average particle size of the graphene was measured according to ISO 13320:2009.

Example 2—Compositions

The first part and the second part were prepared by mixing the ingredients together at room temperature.

Ingredients of the first part are listed in table 2 below. The colour of the composition of first part is transparent.

TABLE 2

| The first part | |
|---|---|
| Raw material | wt % |
| Ethyl cyanoacrylate (from Weifang Dekel Innovative Mater) | 68.9 |
| $BF_3$ (from Henkel) | 3.6 |
| Levapren 900 (from Arlanxeo) | 22.5 |
| Tert-butyl peroxybenzoate (from AkzoNobel) | 5.0 |
| Total | 100.0 |

Ingredients of the second part are listed in table 3 below. The colour of the composition of the second part is Black.

TABLE 3

| Raw material | Example 2A | Example 2B | Example 2C | Example 2D |
|---|---|---|---|---|
| HPMA (from Evonik Industries) | 27.000 | 27.074 | 27.274 | 27.374 |
| CN 104 (from Sartomer) | 50.474 | 50.000 | 50.000 | 50.000 |
| CN 2003 (from Sartomer) | 14.000 | 14.000 | 14.000 | 14.000 |
| XPA (from Yasham speciality ingredients Pvt ltd) | 0.000 | 0.400 | 0.200 | 0.100 |
| PM2 (from Nippon Kayaku) | 0.026 | 0.026 | 0.026 | 0.026 |
| Cu+ (from Sigma Aldrich (Overlack) | 0.500 | 0.500 | 0.500 | 0.500 |
| TS 720 (from Cabot) | 8.000 | 8.000 | 8.000 | 8.000 |
| Total | 100.000 | 100.000 | 100.000 | 100.000 |

The second part

Example 3

The formulations of the first part and the second part were prepared as above and were filled into 50 g 1:1 cartridges and bead time, fixture time and TLS were measured. The test results are listed in table 4.

Viscosity was measured on a Rheometer from Brookfield CAP viscometer Q-2000+ using a cone-plate geometry with spindle no. 5 having a 0.9 cm in diameter plate at 20 rpm shear rates for 1 min. Viscosity units are reported in mPa-s.

Bead time was measured according to the following test method.

A bead of mixed adhesive was dispended onto a polyethylene sheet. Subsequently, the stopwatch was started. After a minute, an applicator stick was dragged across the bead. If the bead was completely broken by dragging the applicator stick, the bead was deemed uncured. If some resistance was observed when the applicator stick was dragged across the bead and only some of the material was dragged from the bead, the bead was considered partially cured. If bead was not dragged, the bead was cured the bead time of the adhesive was recorded from the stop watch.

Fixture time was measured according to the following test method.

Ten mild steel lap shears were lined up the surfaces were cleaned with IPA. A 1.27 cm overlap area were marked off on each lap shear. The mixed composition was dispensed onto the marked off area of the first lap shear so that the whole area was completely covered. The fixture was assembled, and the timer was started when the first fixture was assembled, all together five fixtured were assembled. The fixtures were tested at every four minutes using three kg weight until three consecutive fixtures held for five seconds at a timepoint.

Tensile Lap shear strength (TLS) was measured according to the following test method.

Ten mild steel lap shears were lined up and the surfaces were cleaned with IPA. A 1.27 cm overlap area were marked off on each lap shear. Ten lap shears were bonded to form five pairs. The bonded lap shears were loaded to each end in the tensile grips. According to ASTM D1002 specifies a load control rate of 1,200 to 1,400 psi/minute. A cross head control rate of 0.127 cm/minute approximates the loading rate and is an acceptable mode of control. Applied load on bonded lap shear until it breaks and record the maximum force and failure mode.

T-peel strength was measured on mild steel and aluminium.

Five bonded specimens of mild steel and aluminium of dimension 25.4 mm (1.0 in) long×300 mm (12 in) wide were cut. Each end of the bonded specimens was fixed to tensile grip and the specimens were separated according to ASTM D 1876 at rate of 127 mm (5.0 in)/min for length of the bond line of the specimen. A load was applied on bonded specimen until it broke down and the maximum force and failure mode were recorded.

TABLE 4

| Properties: | Example 3A (First part and second part 2A) | Example 3B (First part and second part 2B) | Example 3C (First part and second part 2C) | Example 3D (First part and second part 2D) |
|---|---|---|---|---|
| Viscosity, Part B (MPas) | 17300 | 27300 | 26700 | 23850 |
| Bead Time (min) | 7 | 8 | 7 | 6 |
| Fixture Time (min) | 13-15 | 13-15 | 13-15 | 13-15 |
| TLS, 40° C./24 hrs, GBMS | 16 | 32 | 19 | 21 |
| TLS, 40° C./24 hrs, Ab. Al | 12 | 14 | 18 | 12 |
| T-peel, 40° C./24 hrs, GBMS | 0.30 | 1.00 | 0.40 | 0.35 |
| T-peel, 40° C./24 hrs, Ab. Al | 0.20 | 0.80 | 0.20 | 0.30 |

Example 3B has high TLS value in GBMS so further was evaluated for T-peel strength which also displayed notable improvement on GBMS and Abraded Aluminium. Since the loading of graphene oxide from 0.4% to 0.8% (3C) had shown dropped in TLS strength on GBMS. The drop indicates the discontinued core polymer matrix which directly affect the strength properties. So, higher loading cause drop in adhesive strength.

The invention claimed is:
1. A two-part cyanoacrylate adhesive comprising
a first part comprising
  a. a cyanoacrylate component;
  b. a peroxide catalyst;
  c. a stabilizer;
  d. a thickener; and
a second part comprising
  e. a (meth)acrylate component;
  f. a graphene oxide;
  g. an adhesion promoter;

h. a metal salt; and
i. a fumed silica.

2. The two-part cyanoacrylate adhesive according to claim 1, wherein said cyanoacrylate component comprises $H_2C=C(CN)-COOR$, wherein R is selected from alkyl, alkoxyalkyl, cycloalkyl, alkenyl, aralkyl, aryl, allyl and haloalkyl groups.

3. The two-part cyanoacrylate adhesive according to claim 1, wherein said cyanoacrylate component is present in an amount of from 60 to 95% by weight of the total weight of the first part.

4. The two-part cyanoacrylate adhesive according to claim 1, wherein said peroxide catalyst is selected from the group consisting of tert-butyl peroxide or tert-butyl perbenzoate, cumene hydroperoxide, tert-butyl peroxybenzoate, diacetyl peroxide, benzoyl peroxide, tert-butyl peracetate, lauryl peroxide and mixtures thereof.

5. The two-part cyanoacrylate adhesive according to claim 1, wherein said peroxide catalyst is present in an amount of from 0.1 to 7% by weight of the total weight of the two-part cyanoacrylate adhesive.

6. The two-part cyanoacrylate adhesive according to claim 1, wherein said (meth)acrylate component comprises from 20 to 50% by weight of a (meth)acrylate monomer comprising OH-group, from 5 to 70% by weight of a (meth)acrylate oligomer A, and from 5 to 25% by weight of a (meth)acrylate oligomer B, based on the total weight of the (meth)acrylate component.

7. The two-part cyanoacrylate adhesive according to claim 1, wherein the (meth)acrylate component is present in an amount of from 80 to 95% by weight of the total weight of the second part.

8. The two-part cyanoacrylate adhesive according to claim 1, wherein said graphene oxide has a specific surface are about 350 $m^2/g$ wherein specific surface area is measured according to ASTM B922-17 and/or an average particle size from 500 to 800 nm wherein average particle size is measured according to ISO 13320:2009 and/or 10-11 graphene platelet layers.

9. The two-part cyanoacrylate adhesive according to claim 1, wherein said graphene oxide is present in an amount of from 0.05 to 1.1% by weight of the total weight of the second part.

10. The two-part cyanoacrylate adhesive according to claim 1, wherein said metal salt is selected from the group consisting of copper-based salts, cobalt-based salts, iron-based salts and mixtures thereof.

11. The two-part cyanoacrylate adhesive according to claim 1, wherein said metal salt is present in an amount of from 0.25 to 0.75% by weight of the total weight of the second part.

12. The two-part cyanoacrylate adhesive according to claim 1, wherein the adhesion promoter of the second part is a polymerizable compound.

13. The two-part cyanoacrylate adhesive according to claim 1, wherein the first part and the second part are present in a ratio of 1:1 by volume.

14. The two-part cyanoacrylate adhesive according to claim 1, wherein the first part is transparent, and the second part is black.

15. The two-part cyanoacrylate adhesive according to claim 1, wherein the first part and the second part are each housed in a separate chamber of a dual chamber container.

* * * * *